United States Patent [19]

Soma et al.

[11] Patent Number: 4,801,414
[45] Date of Patent: Jan. 31, 1989

[54] PRODUCTION OF SILICON NITRIDE SINTERED BODY

[75] Inventors: Takao Soma, Nagoya; Tomonori Takahashi, Chita, both of Japan

[73] Assignee: NGK Insulators, Ltd., Nagoya, Japan

[21] Appl. No.: 12,160

[22] Filed: Feb. 9, 1987

[30] Foreign Application Priority Data

Feb. 25, 1986 [JP] Japan .................................. 61-38316

[51] Int. Cl.$^4$ ............................................. C04B 33/32
[52] U.S. Cl. ........................................ 264/65; 264/66; 264/67
[58] Field of Search .............................. 264/65, 66, 67

[56] References Cited

U.S. PATENT DOCUMENTS

| | | | |
|---|---|---|---|
| 3,983,198 | 9/1976 | Mongels | 264/65 |
| 4,457,958 | 7/1984 | Lange et al. | 264/62 |
| 4,702,869 | 10/1987 | Higuchi et al. | 264/67 |

FOREIGN PATENT DOCUMENTS 58-49509  11/1983  Japan .

OTHER PUBLICATIONS

Petrovic et al., The Strength of Silicon Nitride After Exposure to Different Environments, in Ceramics for High-Performance Applications (1974), pp. 397–414.

*Primary Examiner*—James Derrington
*Attorney, Agent, or Firm*—Parkhurst, Oliff & Berridge

[57] ABSTRACT

A process is disclosed for producing silicon nitride sintered bodies. The process comprises the steps of molding a formulated starting material of silicon nitride, firing a thus obtained molding to obtain a fired body having a desired shape, and then thermally treating the fired body in such an atmosphere that has an oxygen partial pressure higher than that in a firing atmosphere and suppresses a weight increment in oxidation to not more than 0.1 mg/cm$^2$. Working may be done to obtain the desired shape of the fired body after the firing but before the thermal treatment.

10 Claims, No Drawings

PRODUCTION OF SILICON NITRIDE SINTERED BODY

BACKGROUND OF THE INVENTION (1) Field of the Invention

The present invention relates to a process for suitably producing silicon nitride sintered bodies.

(2) Related Art Statement

According to a conventional process of producing silicon nitride sintered bodies, a sintering aid which forms a liquid phase at crystal boundaries, for instance, $Y_2O_3$, $Al_2O_3$, MgO and SrO, is added to a powdery silicon nitride starting material and a resulting mixture is fired in $N_2$ atmosphere at a low $O_2$ partial pressure by using a carbonaceous heater and a carbonaceous firing jig. For instance, Japanese patent publication No. 58-49,509 discloses a method in which firing is carried out in a pressurized $N_2$ atmosphere or a mixed pressurized atmosphere of $N_2$ and an inert gas.

Furthermore, the sintered bodies are reheated to remove flaws on worked surfaces thereof. For instance, in order to improve the surface property, reheating is carried out in an $N_2$ atmosphere or a pressurized $N_2$ atmosphere in Japanese patent application Laid-open No. 60-151,290 while reheating is carried out in an oxidizing atmosphere in U.S. Pat. No. 4,457,958.

By the way, oxide additives and $SiO_2$ which is inherently contained in a silicon nitride starting material and serve as a sintering aids form glass at an intergranular phase upon reaction, so that it effectively promotes the densification of a structure and forms microstructures. However, according to the above-mentioned conventional method, when a molding of silicon nitride is fired in an $N_2$ atmosphere or an $N_2$ pressurized atmosphere at a low partial pressure of $O_2$, as shown in the following formulae (1) and (2), the oxide additive or $SiO_2$ evaporates from the glass phase, or is nitrided. Consequently, contents of O and N in the glass phase vary to change the composition of the intergranular glass phase.

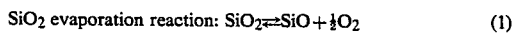

$\text{SiO}_2 \text{ evaporation reaction: } SiO_2 \rightleftharpoons SiO + \tfrac{1}{2}O_2$ (1)

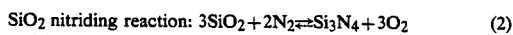

$\text{SiO}_2 \text{ nitriding reaction: } 3SiO_2 + 2N_2 \rightleftharpoons Si_3N_4 + 3O_2$ (2)

For this reason, the conventional methods have the shortcomings that fully densified silicon nitride cannot be obtained; the microstructure becomes different between the surface at which evaporation is easy and the inside in which the evaporation is difficult; and the physical properties of the fired surface are deteriorated. In particular, in the case of silicon nitride sintered bodies added with one or more rare earth element oxides or silicon nitride sintered bodies added with $Y_2O_3$ and/or MgO which have high temperature characteristics improved through crystallizing treatment of the intergranular glass phase, there was a shortcoming that intergranular crystals which have poor oxidation resistance are precipitated in the fired surface due to change in composition of the intergranular glass phase after the crystallization. The above-mentioned shortcomings are not improved by reheating the sintered body in the $N_2$ atmosphere or the $N_2$ pressurized atmosphere at a low $O_2$ partial pressure. Further, reheating under completely oxidative atmosphere causes an oxidized layer to be formed on the surface, thereby deteriorating mechanical characteristics such as hardness, high temperature strength, etc. peculiar to the silicon nitride sintered bodies.

Moreover, when the sintered body is ground and worked after the removal of the surface layer having such poor characteristics or the sintered body is worked to expose the inside thereof (hereinafter referred to as "inside worked face"), for instance, so as to obtain a desired shape, minute cracks are formed on the inside worked face which lower the strength.

When the thus worked bodies are reheated in the $N_2$ atmosphere or the $N_2$ pressurized atmosphere having a low $O_2$ partial pressure, a fired surface having a newly changed composition is formed to deteriorate the characteristics thereof.

SUMMARY OF THE INVENTION

It is an object of the present invention to obviate the above-mentioned shortcomings, and to provide a process for producing sintered bodies of silicon nitride, which are almost free from deterioration in a fired surface and a worked face, due to the evaporation of $SiO_2$ and the nitriding reaction.

According to the present invention, there is a provision of a process for producing silicon nitride sintered bodies, which comprises molding a formulated silicon nitride starting material, firing a resulting molding to obtain a sintered product of a desired shape after being worked or without being worked subsequent to the firing, and subjecting the sintered product to a thermal treatment in such an atmosphere that has an oxygen partial pressure higher than that in a firing atmosphere and suppresses an oxidized weight increment of the silicon nitride sintered body after the thermal treatment to not more than 0.1 mg/cm².

By so doing, oxygen is supplied to the surface of the fired body and the composition of the intergranular glass at the surface of the fired body becomes similar to that of the inside through the thermal treatment in the atmosphere after the firing, in which the oxygen partial pressure is higher than that in the firing atmosphere. In particular, the composition of oxygen and nitrogen on the surface of the fired body is made substantially the same as that of the inside thereof. In addition, in the case of the silicon nitride sintered body in which the intergranular phase is crystallized, the intergranular crystals having excellent oxidation resistance are precipitated in both the fired surface and the inside thereof to conspicuously improve the oxidative characteristics of the sintered body. Besides, since microcracks produced during the working are healed by the thermal treatment after the firing, increased strength and improved oxidation resistance can be attained.

These and other objects, features and advantages of the present invention will be appreciated upon reading of the following description of the invention with the understanding that some modifications, variations and changes of the same could be made by a skilled person in the art to which the invention pertains without departing from the spirit of the invention or the scope of claims appended hereto.

DETAILED DESCRIPTION OF THE INVENTION

The reason why the oxygen partial pressure of the atmosphere in the thermal treatment after the firing is made higher than that in the firing atmosphere is that the effects aimed at by the present invention cannot be recognized when the former is lower than the latter. Further, the reason why the atmosphere in the thermal treatment is specified to give the oxidation weight increment of the silicon nitride sintered body after the thermal treatment being not more than 0.1 mg/cm$^2$ is that when it exceeds 0.1 mg/cm$^2$, the surface of the fired product is covered with the oxide to cause color change and roughenend surface and further deteriorate the mechanical properties such as hardness, high temperature strength, etc. peculiar to the silicon nitride sintered body. The thermal treatment may be performed discontinuously after the firing and cooling, or may be performed continuously subsequent to a cooling step in the firing.

In order to increase the oxygen partial pressure in the atmosphere of the thermal treatment, O$_2$ is added into N$_2$ gas, or air is added into N$_2$ gas. Alternatively, CO$_2$ and CO gas are added to N$_2$ gas in the case that a carbonaceous heater or a carbonaceous firing jig is used, or a substance having an O$_2$ vapor pressure (for instance, an oxide) and an object to be thermally treated are placed together in a furnace (the O$_2$ partial pressure is determined by an O$_2$ vapor pressure of the coexistent substance). The coexistent substance may be either powder or a molding. When the powder is used, the object to be treated may be buried into the coexistent substance or placed separately therefrom. When a fired member is used as the coexistent substance, it may be made in the form of a furnace core tube in which the object is thermally treated.

The process for producing the silicon nitride sintered bodies according to the present invention will be explained in more detail as follows:

First, a silicon nitride powdery starting material is prepared. This silicon nitride powdery starting material is a formulated powder of a silicon nitride raw powder and a sintering aid. Y$_2$O$_3$, MgO, Al$_2$O$_3$ or the like is added as the sintering aid as it is or in a form of a solution. Next, this silicon nitride starting material powder is ground and mixed in a mill by using media. The mill may be either a wet type or a dry type, and for instance, a ball mill, an attrition mill, a vibration mill, etc. are used. Then, a thus obtained molding powder is molded by a dry type press, an injection mold, a slip caster, or the like to obtain a molding of a desired shape. The thus obtained molding is fired at a temperature range from 1,600° to 2,000° C., for example, in an inert atmosphere, thereby obtaining a sintered body.

Next, the thus obtained sintered body is thermally treated in such an atmosphere that has an oxygen partial pressure higher than that in the firing atmosphere and which suppresses the oxidation increment of the silicon nitride sintered body to not more than 0.1 mg/cm$^2$. The above thermal treatment is effected after the sintered body is surface-worked or without surface-working, depending upon use object. The oxygen partial pressure in the thermal treatment is preferably from $10^{-5}$ to $10^{-18}$ atm, and the thermally treating temperature is preferably not less than 800° C. and more preferably not less than 1,000° C. but not more than the firing temperature. Further, in order that the above-mentioned effects may be attained while the evaporation of silicon nitride is suppressed, the total pressure of the atmosphere in the thermal treatment is not less than 1.5 atm.

The present invention will be specifically explained in more detial with reference to the following examples. These examples are given merely in illustration of the invention, but should not be interpreted to limit the scope of the invention.

EXAMPLES

A formulated powder was obtained by adding one or more sintering aids to a silicon nitride raw material powder having a purity of 97.1% by weight at a receipt shown in Tables 1 and 3. This formulated powder was mixed and ground by a water wet type ball mill, dried and granulated, thereby obtaining a molding powder. Next, this molding powder is preliminarily molded, and molded at a pressure of 3 ton/cm$^2$ by a hydrostatic press, thereby preparing a planar molding of 60×60×6 mm. Then, a silicon nitride sintered product to be subjected to the thermal treatment according to the present invention was obtained by firing the molding at 1,700° C. in an N$_2$ atmosphere in an electric furnace with a carbonaceous heater.

By using an oxygen sensor with a zirconia solid electrolyte, the oxygen partial pressure in the firing was determined to be $10^{-18}$ atm by measuring an off gas from the furnace. By using silicon nitride added with rare earth element oxides, sintered bodies were obtained by firing it at 1,850° C. in a pressurized atmosphere of N$_2$ at 10 kg/cm$^2$. The Y$_2$O$_3$- and/or MgO-added silicon nitride sintered bodies and the rare earth element oxide-added silicon nitride sintered bodies shown in Table 1 are matrices in which the intergranular glass phase in crystallized after the firing to improve the high temperature characteristics. Comparative Examples 1 and 6 in Table 1 are silicon nitride sintered bodies in which the crystallization treatment was carried out continuously following to the firing. Examples 1 to 10 are silicon nitride sintered bodies in which the crystallizing treatment is carried out subsequent to the firing and the thermal treatment under conditions in Table 1 according to the present invention.

When the oxygen partial pressure was controlled by adding at least one kind of air, oxygen, carbon dioxide, and carbon monoxide to N$_2$ gas, the oxygen partial pressure in the atmosphere was determined by measuring the off gas from the furnace by means of the zirconia solid electrolyte oxygen sensor.

When the oxygen partial pressure was controlled by placing the substance having an oxygen vapor pressure together in the furnace, equilibrium oxygen partial pressures of the coexistent substance at thermally treating temperatures in an up-to-date edition of "Oxide Manual" of Samsonoff were used to presume the oxygen partial pressure in the thermal treatment.

The oxygen partial pressure given in Tables 1 and 3 were controlled as follows:

In Example 6 of the present invention and Comparative Examples 5 and 12, air or oxygen was mixed into N$_2$ gas in an amount of 0.001 to 0.1%, and thermal treatment was carried out in an alumina furnace core tube. In Examples 1, 2, 7, 8, 9, 10, 11, 12, 13, 14, 17, 18 and 19 of the present invention and Comparative Examples 2, 3, 4, 8, 9, 11 and 15, carbon dioxide and carbon monoxide were added to N$_2$ gas in amounts of from 0 to 0.1% and from 0 to 20%, respectively, and the thermal treatment was effected in a carbonaceous electric furnace by using a carbonaceous sheath. Examples 3, 4, 5 and 15 were each thermally treated in a carbonaceous electric furnace by using a carbonaceous sheath, while MgO (Examples 3 and 5), Al$_2$O$_3$ (Example 4) or SiO$_2$ (Example 15) was placed together.

With respect to each of the sintered bodies, measured values of an increase in weight per unit area after the thermal treatment, strength at room temperature, a weight increment in oxidation per unit area due to oxidation at 800° C. for 100 hours, and strength after the oxidation were shown in Table 1 together with kinds of intergranular crystals in a fired surface and an inside worked face after the crystallization treatment. The intergranular crystals were identified according to an X ray diffraction method with respect to the fired surface and the inside worked face at a depth of 1 mm or more from the surface.

The strengths were measured by a four point bending method according to JIS R-1601 "Fine ceramics bending strength test method" with respect to a case where a tensile face was the fired surface and a case where the tensile face was the inside worked face at a depth of 1 mm or more from the surface. With respect to the weight increase in the oxidation, a sample having the whole surface fired and a sample having the whole surface being an inside worked face worked at a depth of 1 mm or more from the surface were heated in air, and results obtained from the weight increases and the surface areas were shown in Table 1.

TABLE 1

| | Additive (wt %) | | Thermal treatment conditions | | | Weight increase after thermal treatment (mg/cm$^2$) | Fired surface | | | |
|---|---|---|---|---|---|---|---|---|---|---|
| | Y$_2$O$_3$ | MgO | Oxygen partial pressure (atm) | Total pressure | Temperature (°C.) | | Intergranular crystal* | Strength at room temperature (MPs) | Weight increase in oxidation 800° C., 100 hrs (mg/cm$^2$) | Strength after oxidation (MPa) |
| Comparative Example 1 | 8 | 2 | — | — | — | — | N—Me, K | 720 | 3.0 | 100 |
| Comparative Example 2 | 8 | 2 | 10$^{-16}$ | 1.5 | 1900 | −0.003 | K, H | 600 | 1.0 | 340 |
| Example 1 | 8 | 2 | " | " | 1700 | 0.008 | H | 760 | 0.3 | 790 |
| Example 2 | 8 | 2 | " | " | 1500 | 0.009 | H, N—D | 780 | 0.1 | 770 |
| Example 3 | 8 | 2 | " | " | 1300 | 0.012 | H, N—D | 750 | 0.08 | 750 |
| Comparative Example 3 | 8 | 2 | " | " | 600 | 0 | N—Me, K | 710 | 2.8 | 120 |
| Comparative Example 4 | 8 | 2 | 10$^{-20}$ | " | 1500 | −0.005 | N—Me, K | 730 | 3.5 | 90 |
| Example 4 | 8 | 2 | 10$^{-18}$ | " | " | 0.004 | H, N—D | 760 | 0.2 | 790 |
| Example 5 | 8 | 2 | 10$^{-8}$ | " | " | 0.05 | H, N—D | 780 | 0.08 | 760 |
| Example 6 | 8 | 2 | 10$^{-5}$ | " | " | 0.08 | H, N—D | 790 | 0.04 | 760 |
| Comparative Example 5 | 8 | 2 | 10$^{-3}$ | " | " | 0.3 | H, YS | 600 | 0.01 | 580 |
| Comparative Example 6 | 6 | 2 | — | — | — | — | N—Me, K | 820 | 4.6 | 60 |
| Example 7 | 6 | — | 10$^{-16}$ | 0.5 | 1600 | −0.002 | H | 750 | 0.1 | 720 |
| Example 8 | 6 | — | 10$^{-15}$ | 1.5 | " | 0.008 | H | 800 | 0.1 | 810 |
| Example 9 | 6 | — | 10$^{-14}$ | 10 | " | 0.009 | H | 840 | 0.08 | 840 |
| Example 10 | 6 | — | 10$^{-13}$ | 100 | " | 0.009 | H | 870 | 0.09 | 890 |

| | Inside worked face | | | |
|---|---|---|---|---|
| | Intergranular crystal* | Strength at room temperature (MPs) | Weight increase in oxidation 800° C., 100 hrs (mg/cm$^2$) | Strength after oxidation (MPa) |
| Comparative Example 1 | H | 740 | 0.1 | 800 |
| Comparative Example 2 | H | 620 | 0.1 | 640 |
| Example 1 | H | 780 | 0.08 | 810 |
| Example 2 | H, N—D | 790 | 0.06 | 790 |
| Example 3 | H, N—D | 770 | 0.06 | 760 |
| Comparative Example 3 | H | 720 | 0.1 | 770 |
| Comparative Example 4 | H | 750 | 0.1 | 760 |
| Example 4 | H, N—D | 780 | 0.07 | 800 |
| Example 5 | H, N—D | 760 | 0.05 | 750 |
| Example 6 | H, N—D | 780 | 0.08 | 790 |
| Comparative Example 5 | H, N—D | 700 | 0.06 | 780 |
| Comparative Example 6 | H | 780 | 0.1 | 860 |
| Example 7 | H | 820 | 0.08 | 840 |
| Example 8 | H | 830 | 0.07 | 840 |
| Example 9 | H | 850 | 0.07 | 850 |
| Example 10 | H | 900 | 0.08 | 900 |

*N—Me: N—Melilite
K: K—phase
H: H—phase
N—D: N—Diopside
YS: Y$_2$Si$_2$O$_7$

JCPDS card Nos. of the compositions of the intergranular crystals are shown in Table 2. The sintered bodies containing N-Melilite and K-phase have poor oxidation resistance, and suffer a large weight increase due to the oxidation and a lowered strength after the oxidation. To the contrary, the sintered bodies containing H-phase or N-diopside have good oxidation resistance and a small weight increase due to oxidation, and its strength after the oxidation was not lowered.

TABLE 2

| Intergranular crystal | JCPDS card No. | Composition |
|---|---|---|
| N—Melilite | 28-1457 30-1460 | $Y_2O_3 \cdot Si_3N_4$ |
| K—phase | 31-1461 | $2Y_2O_3 \cdot SiO_2 \cdot Si_3N_4$ |
| H—phase | 30-1462 | $10Y_2O_3 \cdot 9SiO_2 \cdot Si_3N_4$ |
| N—Diopside | — | $Y_2O_3 \cdot 4MgO \cdot 5SiO_2 \cdot Si_3N_4$ |

As obvious from Table 1, the sintered bodies (Comparative Examples 1 and 6) having not undergone the thermal treatment have different kinds of intergranular crystals deposited in the fired surface and the inside through the crystallization treatment, and N-Me (N-Melilite) and K (K-phase) which are weak against oxidation are deposited particularly in the fired surface. Accordingly, the weight increase in the oxidation is larger in the fired surface and the strength after the oxidation is extremely lowered.

As compared with this, in the sintered bodies (Examples 1–10) obtained according to the present invention, since the fired surface and the inside are the same and the H (H-phase) and N-D (N-Diopside) having high oxidation resistance are deposited, the weight increase in the oxidation is smaller and deterioration of the strength after the oxidation does not take place.

When the oxygen partial pressure in the thermal treatment is lower than in the firing (Comparative Example 4), no effect of improving the fired surface is obtained. When the oxygen partial pressure is made too large (Comparative Example 5), the weight increase in oxidation exceeds 0.1 mg/cm² and the oxidized layer is formed on the fired surface to lower the strength. When thermal treatment is carried out at a temperature higher than the firing temperature (Comparative Example 2), this leads to overfiring as understood from the fact that the weight decreased in the thermal treatment. Consequently, strength is lowered at both the fired surface and the inside worked face. Further, when the thermal treatment is carried out at a temperature lower than 800° C. (Comparative Example 3), neither weight increase nor decrease in the oxidation is observed in the thermal treatment in a short time which is experimentally allowable and thus no oxygen is supplied inside the sintered body. Thus, no oxygen is supplied into the fired body. Therefore, no effect can not be observed in such a short time. The total pressure of the atmosphere in the thermal treatment is preferably higher than 1.5 atm, because the silicon nitride is spattered during the thermal treatment to prevent the roughening of the fired surface.

Sintered bodies of the silicon nitride added with SrO, MgO and $CeO_2$ and sintered bodies added with $Y_2O_3$ and $Al_2O_3$ shown in Table 3 are silicon nitride sintered bodies in which the intergranular phase is a glass phase. With respect to the samples each having the whole surface fired and samples each having the whole surface being an inside worked face worked at a depth of 1 mm or more from the surface, thermal treatment was carried out under conditions shown in Table 3. Then, weight increase due to the thermal treatment, strength at room temperature, and weight increase per unit area in oxidation at 1,200° C. for 100 hours were measured according to the above-mentioned methods. Results are shown in Table 3.

TABLE 3(a)

| | Additive (wt %) | | | | | Thermal treatment conditions | | |
|---|---|---|---|---|---|---|---|---|
| | SrO | MgO | $CeO_2$ | $Y_2O_3$ | $Al_2O_3$ | Oxygen partial pressure (atm) | Total pressure (atm) | Temperature (°C.) |
| Comparative Example 7 | 1 | 4 | 5 | | | — | — | — |
| Comparative Example 8 | 1 | 4 | 5 | | | $10^{-14}$ | 1.5 | 1800 |
| Example 11 | 1 | 4 | 5 | | | " | " | 1400 |
| Example 12 | 1 | 4 | 5 | | | " | " | 1000 |
| Example 13 | 1 | 4 | 5 | | | " | " | 800 |
| Comparative Example 9 | 1 | 4 | 5 | | | " | " | 600 |
| Comparative Example 10 | | | | 5 | 5 | — | — | — |
| Comparative Example 11 | | | | 5 | 5 | $10^{-20}$ | 1.5 | 1400 |
| Example 14 | | | | 5 | 5 | $10^{-15}$ | " | " |
| Example 15 | | | | 5 | 5 | $10^{-8}$ | " | " |
| Comparative Example 12 | | | | 5 | 5 | $10^{-3}$ | " | " |
| Example 16 | | | | 5 | 5 | $10^{-15}$ | 0.1 | " |
| Example 17 | | | | 5 | 5 | $10^{-14}$ | 5 | " |
| Example 18 | | | | 5 | 5 | $10^{-13}$ | 10 | " |
| Example 19 | | | | 5 | 5 | $10^{-12}$ | 100 | " |

TABLE 3(b)

| | Fired surface | | | Inside worked face | | |
|---|---|---|---|---|---|---|
| | Weight increase in thermal treatment (mg/cm²) | Strength at room temperature (MPa) | Weight increase in oxidation 1200° C., 100 hrs (mg/cm²) | Weight increase in thermal treatment (mg/cm²) | Strength at room temperature (MPa) | Weight increase in oxidation 1200° C., 100 hrs (mg/cm²) |
| Comparative Example 7 | — | 820 | 3.0 | — | 810 | 3.2 |

TABLE 3(b)-continued

| | Fired surface | | | Inside worked face | | |
|---|---|---|---|---|---|---|
| | Weight increase in thermal treatment (mg/cm$^2$) | Strength at room temperature (MPa) | Weight increase in oxidation 1200° C., 100 hrs (mg/cm$^2$) | Weight increase in thermal treatment (mg/cm$^2$) | Strength at room temperature (MPa) | Weight increase in oxidation 1200° C., 100 hrs (mg/cm$^2$) |
| Comparative Example 8 | −0.01 | 720 | 2.4 | −0.005 | 730 | 2.0 |
| Example 11 | 0.03 | 840 | 1.4 | 0.02 | 880 | 1.0 |
| Example 12 | 0.02 | 840 | 1.6 | 0.02 | 890 | 1.3 |
| Example 13 | 0.007 | 820 | 2.0 | 0.008 | 870 | 1.6 |
| Comparative Example 9 | 0.001 | 810 | 3.1 | 0.001 | 820 | 2.8 |
| Comparative Example 10 | — | 700 | 0.43 | — | 670 | 0.47 |
| Comparative Example 11 | 0 | 660 | 0.45 | 0 | 670 | 0.45 |
| Example 14 | 0.02 | 710 | 0.08 | 0.03 | 760 | 0.07 |
| Example 15 | 0.04 | 720 | 0.02 | 0.04 | 740 | 0.02 |
| Comparative Example 12 | 0.28 | 580 | 0.01 | 0.34 | 570 | 0.01 |
| Example 16 | −0.001 | 600 | 0.10 | −0.002 | 610 | 0.11 |
| Example 17 | 0.02 | 710 | 0.07 | 0.03 | 780 | 0.08 |
| Example 18 | 0.02 | 710 | 0.06 | 0.04 | 770 | 0.08 |
| Example 19 | 0.03 | 720 | 0.06 | 0.03 | 790 | 0.08 |

As obvious from Table 3, as compared with the sintered bodies having undergone no thermal treatment (Comparative Examples 7 and 10), the fired bodies (Examples 11–19) having undergone the thermal treatment had increased strength at the inside worked face and increased oxidation resistance both in the fired surface and the inside worked face. This is because microcracks formed in the inside working are closed by the thermal treatment and the amount of nitrogen in the intergranular glass phase decreases during the thermal treatment. When the thermal treatment temperature is made higher than the firing temperature (1,700° C.) (Comparative Example 8), the strength is lowered in both the fired surface and the inside worked face due to the overfiring. When the temperature is lower than 800° C. (Comparative Example 9), the effect is not observed in the thermal treatment in a short time. When the oxygen partial pressure of the atmosphere in the thermal treatment is lower than that in the firing (Comparative Example 11), strength and the oxidation resistance are lowered at the worked face as in the case of the fired face. When the oxygen partial pressure is too large (Comparative Example 12), the weight increase in the oxidation during the thermal treatment becomes larger, and the oxidized layer is formed on the surface to lower the strength.

Further, it is preferable that the total pressure is higher than 1.5 atm in the atmosphere of the thermal treatment, since the evaporation of silicon nitride is prevented during the thermal treatment.

As obvious from the above-mentioned explanation, according to the method of producing the silicon nitride sintered body of the present invention, oxygen is supplied to the surface of the fired body and the composition of the intergranular glass at the surface of the fired body is approached to that of the inside through the thermal treatment in the atmosphere after the firing, in which the oxygen partial pressure is higher than that in the firing atmosphere. In addition, influences of minute cracks produced during working are diminished.

What is claimed is:

1. A process for producing a silicon nitride sintered body, comprising the steps of:
    molding a formulated batch of starting materials of silicon nitride to form a molded body;
    firing said molded body to obtain a fired body having a desired shape; and
    thermally treating the fired body in an atmosphere having a total pressure of not less than 1.5 atm and having an oxygen partial pressure which is higher than an oxygen partial pressure of a firing atmosphere present in the firing step, such that the thermally treating atmosphere suppresses a weight increment in oxidation of the thermally treated silicon nitride sintered body to not more than 0.1 mg/cm$^2$.

2. A process according to claim 1, wherein the desired shape of the fired body is obtained through working said body after the firing step and before the thermal treatment.

3. A process according to claim 1, wherein said oxygen partial pressure present in the thermal treatment is controlled by mixing and at least one gas selected from the group of gases consisting of air, oxygen, carbon dioxide and carbon monoxide.

4. A process according to claim 2, wherein the said oxygen partial pressure treatment is controlled by mixing and at least one gas selected from the group of gases consisting of air, oxygen, carbon dioxide and carbon monoxide.

5. A process according to claim 1, wherein said oxygen partial pressure present in the thermal treatment is controlled by placing a substance having an oxygen vapor pressure in communication with the fired body, and arranging said substance and said body in a furnace.

6. A process according to claim 2, wherein said oxygen partial pressure present in the thermal treatment is controlled by placing a substance having an oxygen vapor pressure in communication with the fired body and arranging said substance and said body in a furnace.

7. A process according to claim 1, wherein the temperature of the thermal treatment is not less than 80020 C. and not more than a temperature of the firing step.

8. A process according to claim 2, wherein the temperature of the thermal treatment is not less than 800° C. and not more than a temperature of the firing step.

9. A process according to claim 7, wherein the temperature of the thermal treatment is not less than 1,000° C.

10. A process according to claim 8, wherein the temperature of the thermal treatment is not less than 1,000° C.

* * * * *